(12) United States Patent
Masuda et al.

(10) Patent No.: US 10,683,167 B2
(45) Date of Patent: Jun. 16, 2020

(54) AUTOMATED WAREHOUSE AND SUSPENSION-TYPE STACKER CRANE

(71) Applicant: Murata Machinery, Ltd., Kyoto-shi, Kyoto (JP)

(72) Inventors: Junichi Masuda, Inuyama (JP); Akito Tai, Inuyama (JP)

(73) Assignee: Murata Machinery, Ltd., Kyoto (JP)

( * ) Notice: Subject to any disclaimer, the term of this patent is extended or adjusted under 35 U.S.C. 154(b) by 276 days.

(21) Appl. No.: 15/569,360

(22) PCT Filed: Apr. 1, 2016

(86) PCT No.: PCT/JP2016/060931
§ 371 (c)(1),
(2) Date: Oct. 25, 2017

(87) PCT Pub. No.: WO2016/178347
PCT Pub. Date: Nov. 10, 2016

(65) Prior Publication Data
US 2018/0297779 A1    Oct. 18, 2018

(30) Foreign Application Priority Data

May 1, 2015   (JP) .................................. 2015-094370

(51) Int. Cl.
*B65G 1/04*       (2006.01)
*B65G 54/02*      (2006.01)
*B66F 9/07*       (2006.01)

(52) U.S. Cl.
CPC ......... *B65G 1/0421* (2013.01); *B65G 1/0407* (2013.01); *B65G 54/02* (2013.01); *B66F 9/07* (2013.01)

(58) Field of Classification Search
CPC .... B65G 1/0421; B65G 1/0407; B65G 54/02; B66F 9/07
See application file for complete search history.

(56) References Cited

U.S. PATENT DOCUMENTS

| 7,780,020 B2* | 8/2010 | Yoshitaka | B65G 37/02 212/332 |
| 2003/0185656 A1* | 10/2003 | Hansl | B65G 1/0435 414/277 |

(Continued)

FOREIGN PATENT DOCUMENTS

| JP | 52-025381 A | 2/1977 |
| JP | 09-040116 A | 2/1997 |

(Continued)

OTHER PUBLICATIONS

English language translation of International Search Report dated Jul. 5, 2016 issued in corresponding PCT Application PCT/JP2016/060931.

(Continued)

*Primary Examiner* — Saul Rodriguez
*Assistant Examiner* — Ashley K Romano
(74) *Attorney, Agent, or Firm* — DLA Piper LLP (US)

(57) ABSTRACT

A low cost automated warehouse that enables a plurality of types of stacker cranes to travel and support articles with different weights is provided. The warehouse includes a rack with multiple levels of shelves, a track along the rack at a position higher than the multiple levels of shelves, and a first and second suspension type stacker crane. The first suspension type stacker crane includes a plurality of driving trucks arranged in a traveling direction, a mast extending in the vertical direction, and a first transfer device suspended in a liftable manner. The second suspension type stacker crane includes a plurality of driving trucks whose number is smaller than the number of the driving trucks of the first suspension type stacker crane, arranged in the traveling direction, a mast extending in the vertical direction, and a second transfer device suspended in a liftable manner.

7 Claims, 17 Drawing Sheets

(56) References Cited

U.S. PATENT DOCUMENTS

| | | | |
|---|---|---|---|
| 2004/0216957 A1* | 11/2004 | Hansl | B65G 1/0407 187/247 |
| 2007/0140817 A1* | 6/2007 | Hansl | B66F 9/063 414/277 |
| 2012/0114453 A1 | 5/2012 | Ota et al. | |
| 2012/0183377 A1* | 7/2012 | Toguri | B65G 1/0421 414/281 |
| 2013/0313070 A1* | 11/2013 | Ogawa | B65G 35/06 198/370.01 |
| 2016/0071754 A1 | 3/2016 | Ota et al. | |

FOREIGN PATENT DOCUMENTS

| | | |
|---|---|---|
| JP | 3206858 B2 | 9/2001 |
| JP | 2003-335402 A | 11/2003 |
| JP | 2005-185043 A | 7/2005 |
| JP | 2007-070086 A | 3/2007 |
| WO | 2011-148459 A1 | 12/2011 |

OTHER PUBLICATIONS

International Preliminary Report on Patentability dated Nov. 2, 2017 in PCT Application No. PCT/JP2016/060931 filed Apr. 1, 2016.

* cited by examiner

AUTOMATED WAREHOUSE AND SUSPENSION-TYPE STACKER CRANE

CROSS REFERENCE TO RELATED APPLICATIONS

This application is a national stage of international application no. PCT/JP2016/060931, filed on Apr. 1, 2016, and claims the benefit of priority under 35 USC 119 of Japanese application no. 2015-094370, filed on May 1, 2015, both of which are incorporated herein by reference in their entirety.

TECHNICAL FIELD

The present invention relates to an automated warehouse and a suspension type stacker crane. In particular, the present invention relates to an automated warehouse including a suspension type stacker crane having a transfer device suspended from driving trucks in a liftable manner.

BACKGROUND ART

A conventional automated warehouse includes a plurality of racks. The racks are arranged in parallel, and each rack includes a plurality of shelves arranged in an extending direction and a vertical direction.

In addition, the automated warehouse includes a stacker crane as a transport device for unloading an article onto a shelf of the rack or loading an article from a shelf of the rack. The stacker crane includes a traveling device that travels along a rail, a transfer device, and a lifting device that moves the transfer device in the vertical direction. A part of the rail is disposed besides the rack, and the stacker crane positions the transfer device besides the rack and near a target shelf so as to transfer an article in this state (see, for example, Patent Citation 1).

PRIOR ART CITATIONS

Patent Citation

Patent Citation 1: JP-A-2007-70086

SUMMARY OF INVENTION

Technical Problem

The traveling device of the stacker crane is constituted of various motors, traveling wheels, and other devices, for example.

Further, there are heavy loads and light loads as the article to be transported, and hence it is possible to prepare a stacker crane that can transport heavy loads and to transport not only heavy loads but also light loads with the stacker crane. In addition, it is also possible to provide the stacker crane with different types of traveling devices according to types of the article.

However, in the former case, it means that a large stacker crane is always used. In the latter case, it means that different traveling devices are disposed for different stacker cranes. In either case, the cost may be increased.

It is an object of the present invention to enable a plurality of types of stacker cranes to travel, which can support articles with different weights with low cost in an automated warehouse.

Aspects of the present invention are explained below as the technical solution. These aspects can be arbitrarily combined as needed.

An automated warehouse according to one aspect of the present invention includes a rack, a track, a first suspension type stacker crane, and a second suspension type stacker crane.

The rack includes multiple levels of shelves.

The track is disposed along the rack at a position higher than the multiple levels of shelves.

The first suspension type stacker crane includes a plurality of driving trucks arranged in a traveling direction so as to travel along the track, a mast extending in the vertical direction, and a first transfer device suspended in a liftable manner with respect to the plurality of driving trucks and capable of moving up and down along the mast; and The second suspension type stacker crane includes a plurality of driving trucks whose number is smaller than the number of the driving trucks of the first suspension type stacker crane, arranged in the traveling direction so as to travel along the track, a mast extending in the vertical direction, and a second transfer device suspended in a liftable manner with respect to the plurality of driving trucks, and capable of moving up and down along the mast, so as to transfer an article lighter than the article transferred by the first transfer device.

The minimum of the difference between the number of the driving trucks of the second suspension type stacker crane and the number of the driving trucks of the first suspension type stacker crane should be just one. The former may be the specified fraction of the integer of the latter, for example, ½, ⅓, ¼ of the latter.

According to one aspect, the first suspension type stacker crane and the second suspension type stacker crane may respectfully include a first lift device and a second lift device configured to lift the first transfer device and the second transfer device respectively.

According to this automated warehouse, the first suspension type stacker crane and the second suspension type stacker crane have different numbers of driving trucks, so as to support articles with different weights. In other words, by adopting the structure of using different numbers of the same type driving trucks, two types of stacker cranes capable of carrying articles with different weights can travel the same track. As a result, low cost of the automated warehouse can be realized.

The track may have a round track.

Each of the first suspension type stacker crane and the second suspension type stacker crane further may have a bogie structure.

The bogie structure includes a bogie member supporting two driving trucks neighboring in the traveling direction, in a rotatable manner about vertical axes.

The number of the bogie structures of the second suspension type stacker crane may be smaller than the number of the bogie structures of the first suspension type stacker crane.

According to this automated warehouse, with the bogie structure, the two driving trucks are supported in a rotatable manner with respect to the bogie member. With this structure, the first suspension type stacker crane and the second suspension type stacker crane can stably travel curves of the round track.

Each of the driving trucks includes a power receiving device and a branch switching roller.

According to this automated warehouse, because each of the driving trucks is provided with the power receiving device and the branch switching roller, it is easy to support increase or decrease of the number of driving trucks. In addition, because the driving trucks can be separately controlled, it is possible to perform easy and precise control.

According to one aspect, a controller may be provided. The controller may control the operation of the branch switching roller.

According to one aspect, the controller is provided in each of the first suspension type stacker crane and the second suspension type stacker crane.

According to one aspect, the controller may control the operation of the driving trucks.

According to one aspect, the controller may control the operation of the lift device.

A suspension type stacker crane according to another aspect of the present invention is used in an automated warehouse constituted of a rack including multiple levels of shelves, and a track disposed along the rack at a position higher than the multiple levels of shelves. The stacker crane includes a plurality of driving trucks, a mast, and a transfer device.

The plurality of driving trucks is arranged in a traveling direction so as to travel along the track.

The mast extends in the vertical direction.

The transfer device is suspended in a liftable manner with respect to the plurality of driving trucks and capable of moving up and down along the mast.

According to this stacker crane, the plurality of the driving trucks is arranged in the travelling direction so as to travel along the track. Accordingly, it is possible to support articles with different weights by changing the number of the driving trucks.

The track may have a round track. The suspension type stacker crane further has a bogie structure. The bogie structure includes a bogie member supporting two driving trucks neighboring in the traveling direction, in a rotatable manner about a vertical axis.

Each of the driving trucks may include a power receiving device and a branch switching roller.

Effects of the Invention

According to the automated warehouse of the present invention, a plurality of types of stacker cranes can travel, which can support articles with different weights with low cost.

DESCRIPTION OF EMBODIMENTS

1. First Embodiment (1) Picking System

Figure 1:
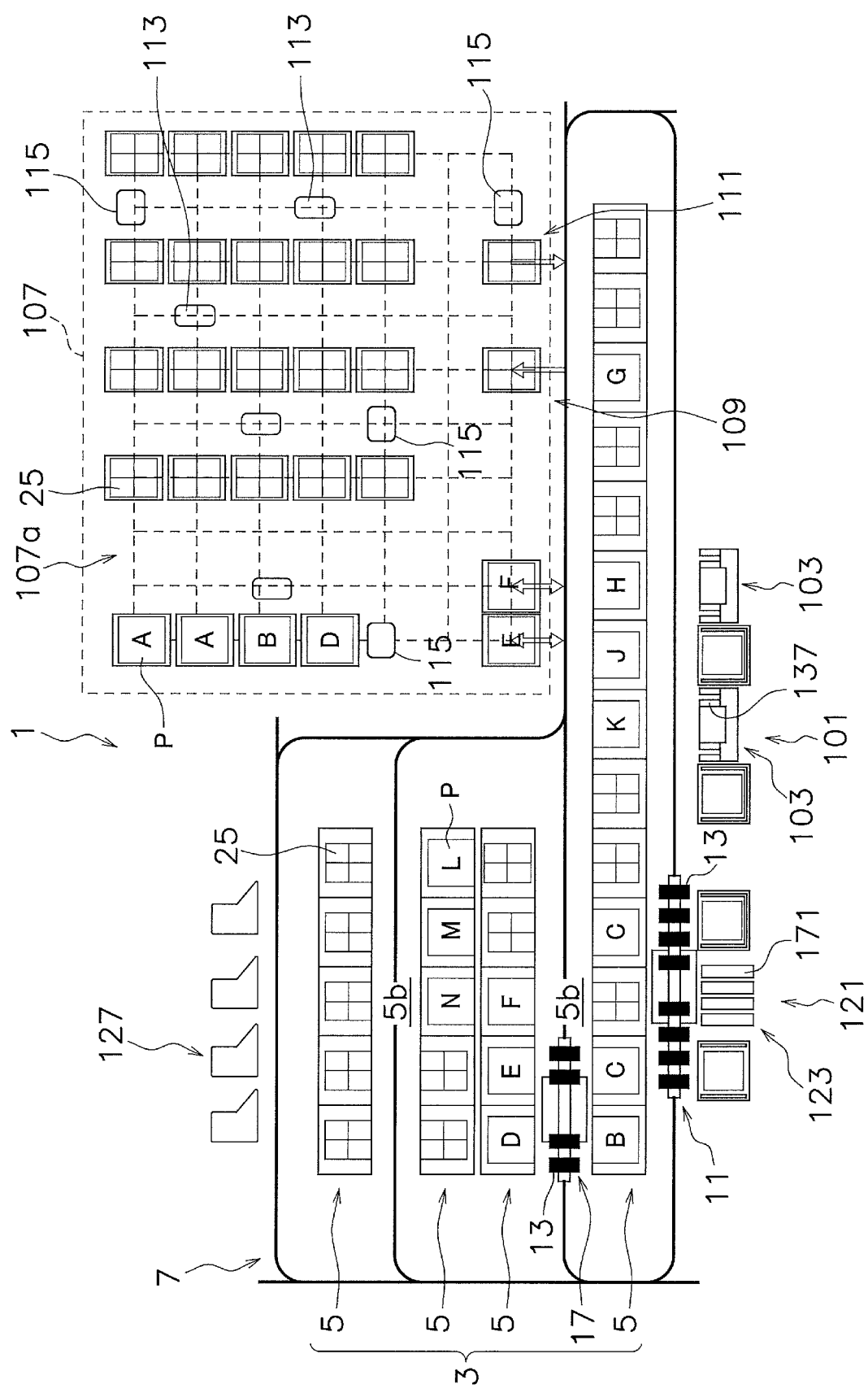
FIG. 1 is a schematic plan view of a picking system as an embodiment of the present invention.
Figure 2:
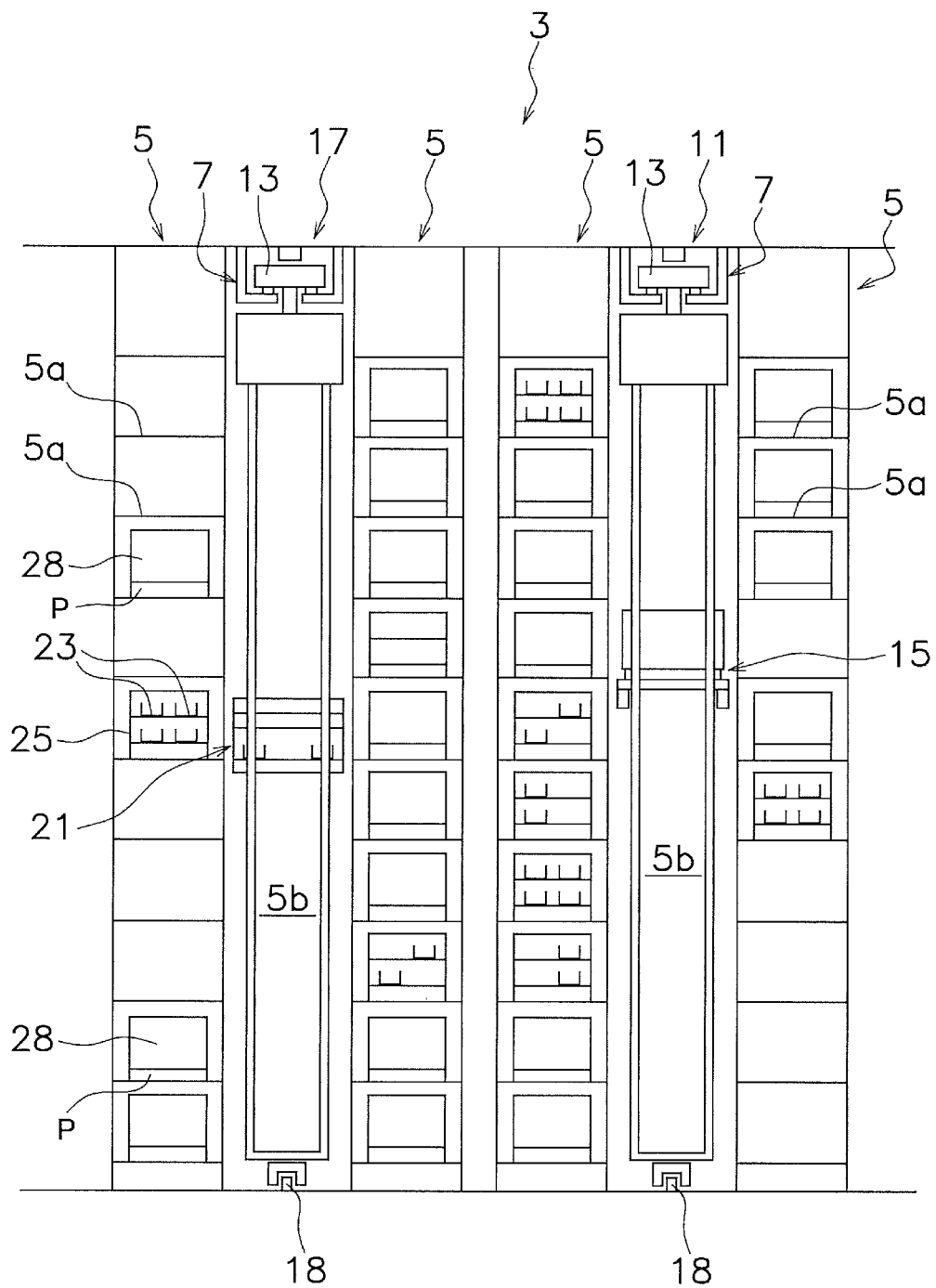
FIG. 2 is a schematic front view of an automated warehouse of the picking system.

With reference to FIGS. 1 and 2, a picking system 1 is described. The picking system 1 is a system for picking (assortment of load) in a warehouse. The picking system 1 mainly includes an automated warehouse 3. FIG. 1 is a schematic plan view of a picking system as an embodiment of the present invention. FIG. 2 is a schematic front view of the automated warehouse of the picking system. Note that this picking system 1 can be applied to a parts warehouse of a factory, a general distribution warehouse, and the like, and in particular is suitable for a warehouse of mail-order goods for general consumers, for example, having a large number of orders, a large number of goods, and many types of goods.

The automated warehouse 3 includes a plurality of racks 5. The rack 5 includes multiple levels of shelves 5a. The plurality of racks 5 are disposed in parallel so as to extend in a left and right direction in FIG. 1. The shelf 5a can store a goods collection shelf member 25 as illustrated in FIG. 2. Note that the shelf 5a can also store a goods storing box 28 storing one dozen of goods, for example, by means of a pallet P. A container 23 is also called a case or a packet, and is a member capable of storing goods. The goods collection shelf member 25 is also called a carrier, which can store a plurality of the containers 23. The goods collection shelf member 25 has a shelf structure with multiple levels of supporting parts. Note that the number of containers that can be stored in the goods collection shelf member 25 and the structure of the goods collection shelf member 25 are not limited in particular. However, the bottom surface of the goods collection shelf member 25 has the same structure as the bottom surface of the pallet P, and hence a first stacker crane 11 can support and transport the same. In addition, in FIG. 1, the pallets are denoted by symbol P.

The automated warehouse 3 includes ceiling rails 7 (an example of tracks) disposed along the racks 5. The ceiling rails 7 are disposed at positions higher than the racks 5, i.e. higher than the multiple levels of shelves 5a. The ceiling rails 7 have a plurality of round tracks.

The ceiling rail 7 is disposed above a lane 5b between the racks 5.

The automated warehouse 3 includes two types of stacker cranes, i.e., the first stacker crane 11 and a second stacker crane 17. FIG. 1 shows one first stacker crane 11 and one second stacker crane 17, but the number of each stacker crane is not limited in particular.

The first stacker crane 11 travels along the ceiling rail 7. The first stacker crane 11 is a suspension type stacker crane and travels in a suspended state from the ceiling rail 7 as illustrated in FIG. 2. The first stacker crane 11 is driven to travel and branches to travel using the ceiling rail 7. Note that it is possible to dispose a lower part guide rail 18 so as to support a lower part of the first stacker crane 11 as illustrated in FIG. 2. The lower part guide rail 18 is disposed in a straight path part of the lane 5b in front of the racks, for example.

Figure 3:
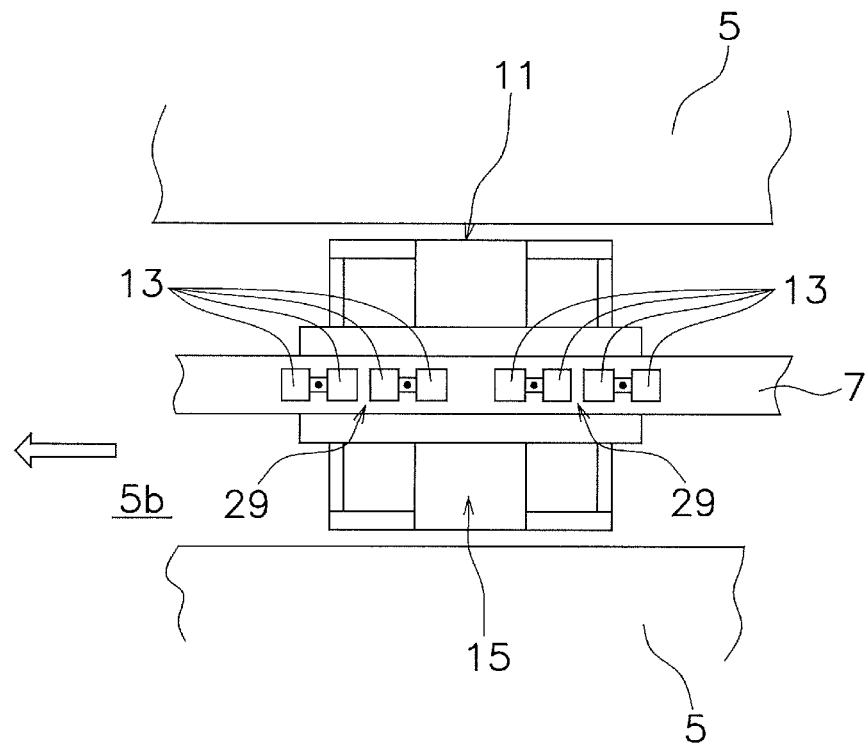
FIG. 3 is a schematic plan view of a first stacker crane.

As illustrated in FIG. 3, the first stacker crane 11 includes a plurality of driving trucks 13 arranged in a traveling direction (illustrated by a white arrow). In this embodiment, eight driving trucks 13 are arranged. FIG. 3 is a schematic plan view of the first stacker crane.

The first stacker crane 11 includes a first transfer device 15 suspended in a liftable manner with respect to the plurality of driving trucks 13. The first transfer device 15 can transfer the goods collection shelf member 25 or the pallet P.

As described above, the suspension type stacker crane has an upper part structure that performs traveling and branching, and suspends a lower part structure. However, the suspension type stacker crane may have caster wheels rolling on the floor surface.

Figure 4:
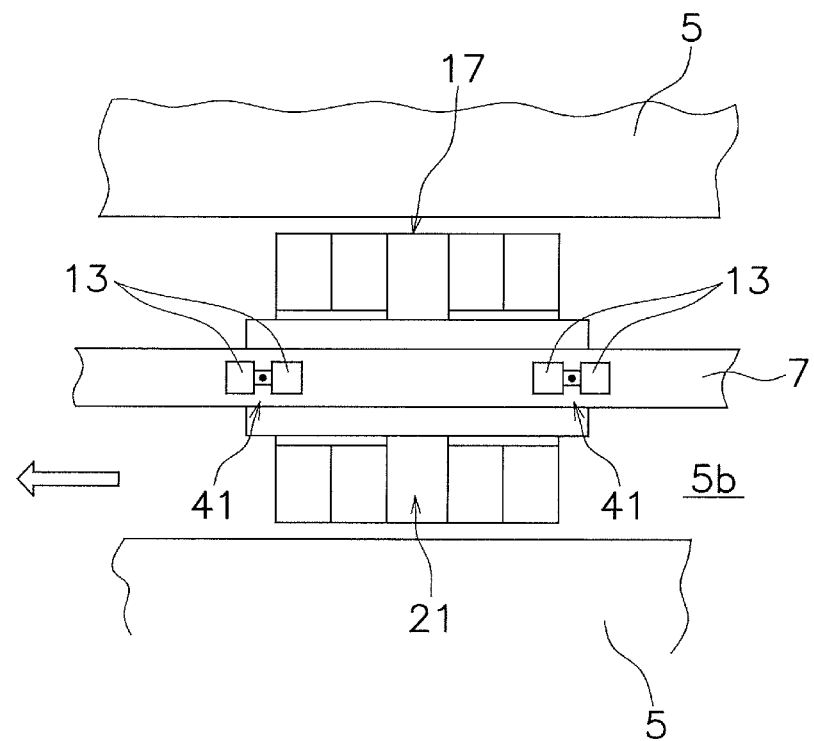
FIG. 4 is a schematic plan view of a second stacker crane.

The second stacker crane 17 travels along the ceiling rail 7. As illustrated in FIG. 2, the second stacker crane 17 is a suspension type stacker crane and travels in a suspended state from the ceiling rail 7. As illustrated in FIG. 4, the second stacker crane 17 includes the plurality of driving trucks 13 arranged in the traveling direction. The driving truck 13 of the second stacker crane 17 has the same structure as the driving truck 13 of the first stacker crane 11. In this embodiment, four driving trucks 13 are arranged. In other words, the number of the driving trucks 13 of the second stacker crane 17 is smaller than the number of the driving trucks 13 of the first stacker crane 11. FIG. 4 is a schematic plan view of the second stacker crane.

The second stacker crane 17 includes a second transfer device 21 suspended in a liftable manner with respect to the plurality of driving trucks 13. The second transfer device 21 can transfer the container 23.

As described above, the first stacker crane 11 and the second stacker crane 17 travel the same track. That is, a traveling mechanism is modularized, and hence the track is commonized.

The first stacker crane 11 and the second stacker crane 17 have different numbers of driving trucks, so as to support articles with different weights. In other words, by adopting the structure of using different numbers of the same type driving trucks, two types of stacker cranes capable of carrying articles with different weights can travel the same track. As a result, low cost of the automated warehouse 3 can be realized.

As an example, if two driving trucks can suspend 2,000 kgf, the first stacker crane 11 can suspend total 8,000 kgf of body weight and article weight, and the second stacker crane 17 can suspend total 4,000 kgf of the body weight and the article weight.

(2) First Stacker Crane

Figure 5:
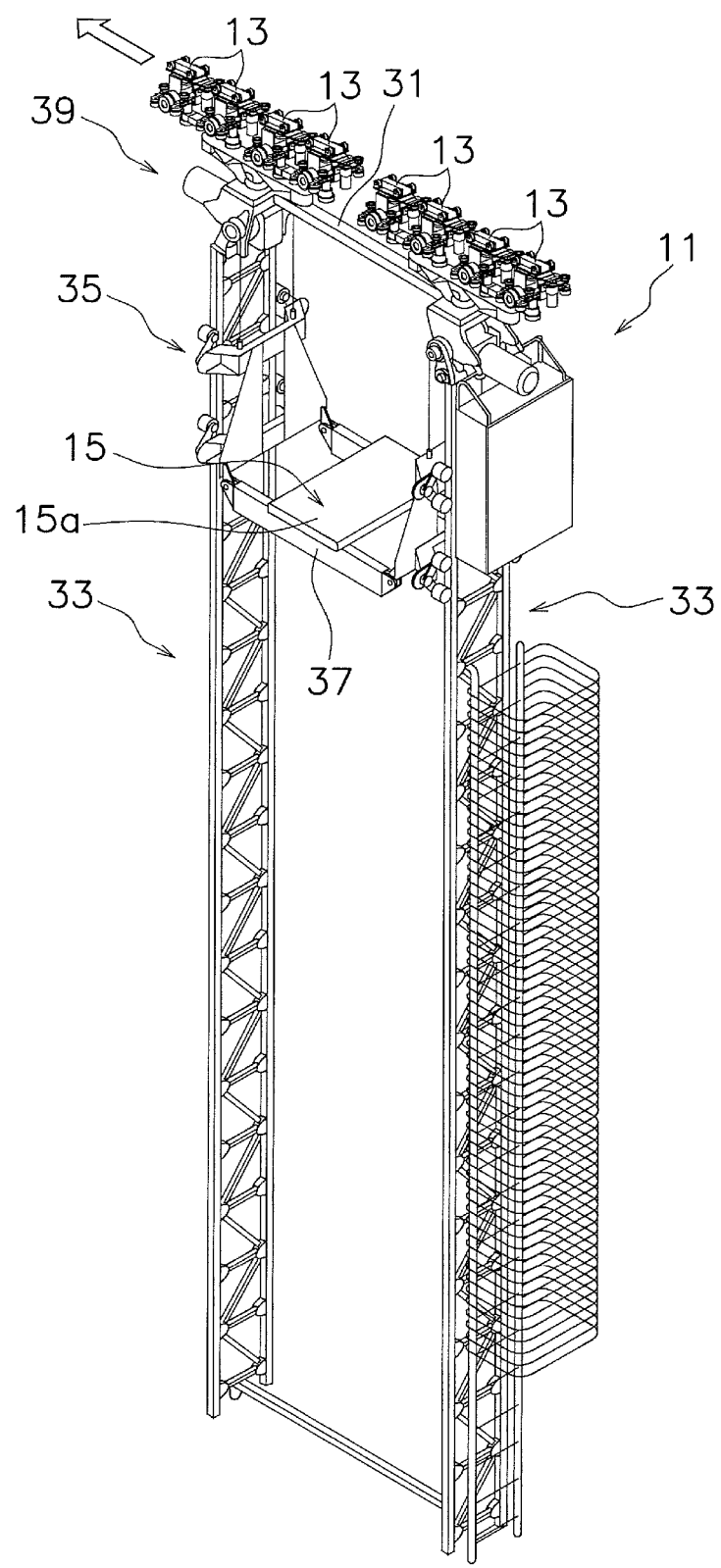
FIG. 5 is a perspective view of the first stacker crane.
Figure 6:
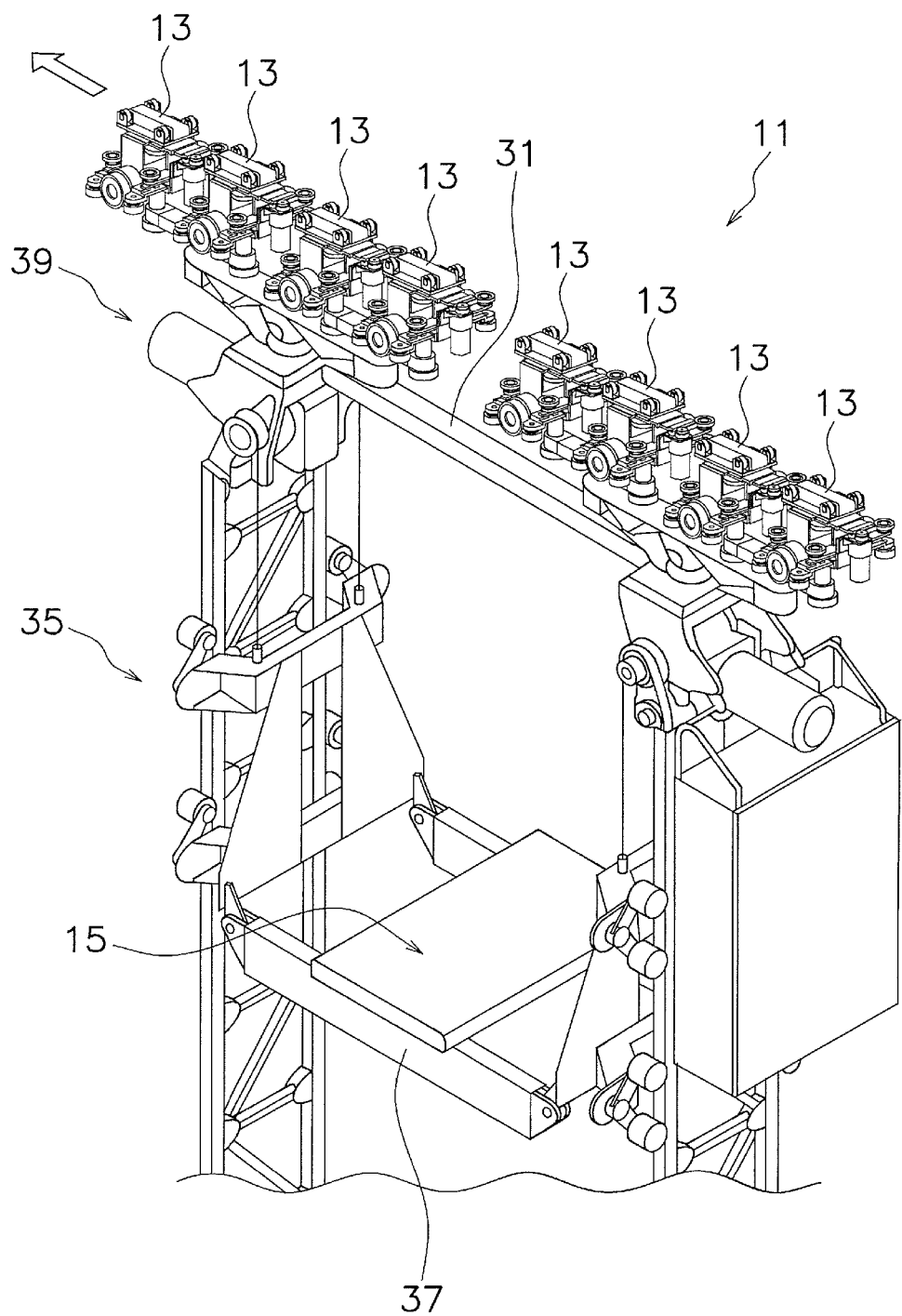
FIG. 6 is a perspective view of an upper part of the first stacker crane.

With reference to FIGS. 5 and 6, the first stacker crane 11 is described. FIG. 5 is a perspective view of the first stacker crane. FIG. 6 is a perspective view of an upper part of the first stacker crane.

Figure 13:
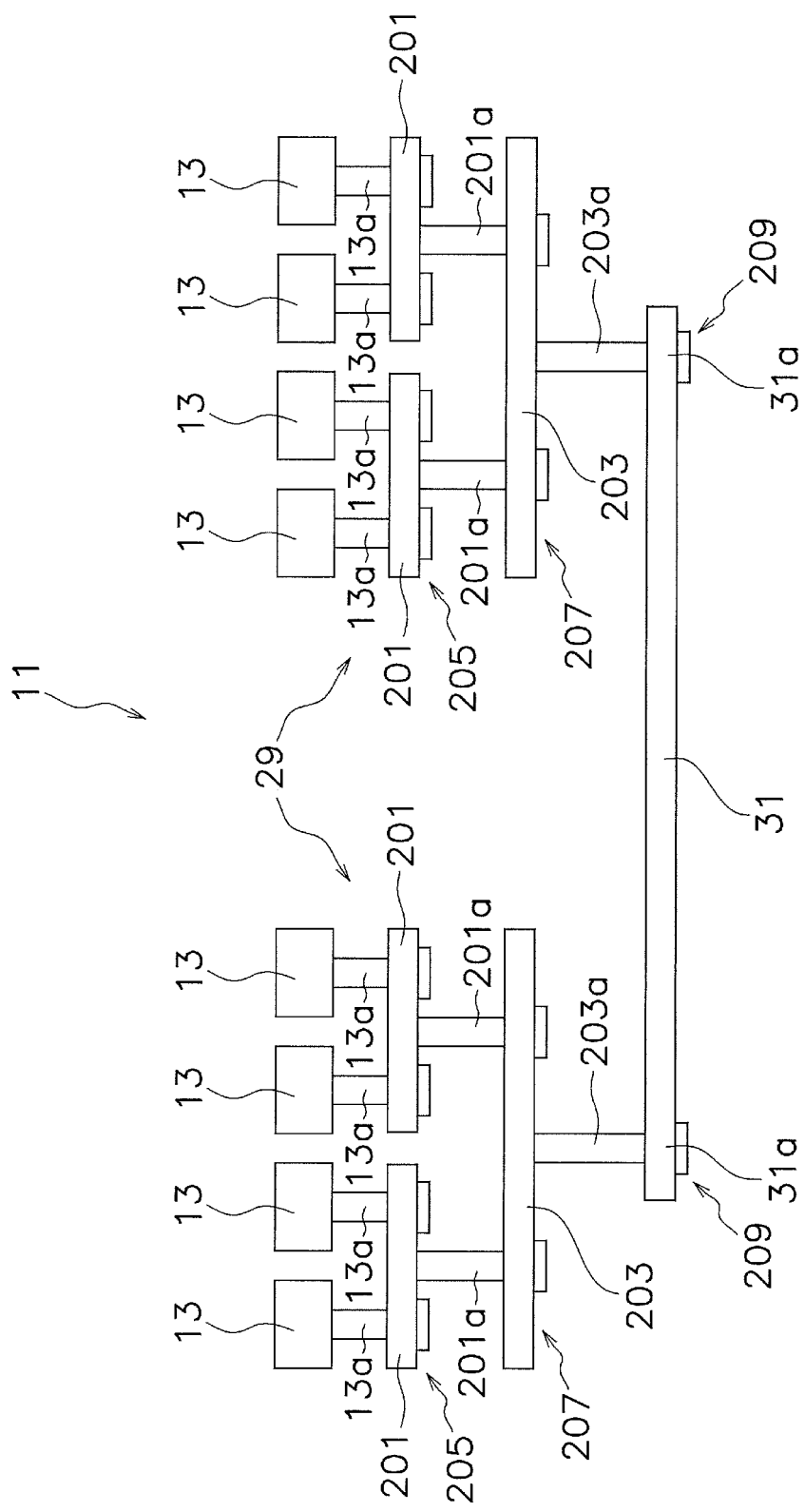
FIG. 13 is a schematic side view illustrating a schematic structure of the first bogie structure.

As illustrated in FIGS. 5 and 6, eight driving trucks 13 are arranged in the traveling direction. Further, as illustrated in FIGS. 3 and 13, the driving trucks 13 constitute a first bogie structure 29. The first bogie structure 29 includes a first member 201 by which two driving trucks 13 neighboring in the traveling direction are supported in a rotatable manner about the vertical axis.

With the first bogie structure 29, the two driving trucks 13 are supported in a rotatable manner with respect to the first member 201. With this structure, the first stacker crane 11 and the second stacker crane 17 can stably travel curves of the round track. Note that details of the first bogie structure 29 will be described later.

The first stacker crane 11 includes an upper side base member 31 equipped with the driving trucks 13. The upper side base member 31 extends long in the traveling direction. The first stacker crane 11 further includes a pair of masts 33 extending downward from both ends of the upper side base member 31. The mast 33 extends close to the floor surface. The pair of masts 33 are supported by the upper side base member with pins so as to be capable of rocking in the traveling direction. With the structure described above, damping control and reduction of body weight can be realized.

The first stacker crane 11 includes a lifting device 35 for lifting up and down the first transfer device 15. The lifting device 35 includes a lift table 37 supported by the masts 33, and a lifting unit 39 for lifting up and down the lift table 37. The first transfer device 15 is mounted to the lift table 37. The lifting unit 39 is a known device including a motor, a belt, a guide roller, and the like.

Note that in this embodiment, four driving trucks 13 are disposed corresponding to the mast 33 on the front side in the traveling direction, and four driving trucks 13 are disposed corresponding to the mast 33 on the rear side in the traveling direction. In particular, the four driving trucks 13 are arranged so that the traveling direction center of the four driving trucks 13 corresponds to the mast 33. With the structure described above, the driving trucks 13 can uniformly support weight applied from the mast 33.

However, the number of the driving trucks 13 and the arrangement of them are not limited to those in the embodiment described above.

(3) Second Stacker Crane

Figure 7:
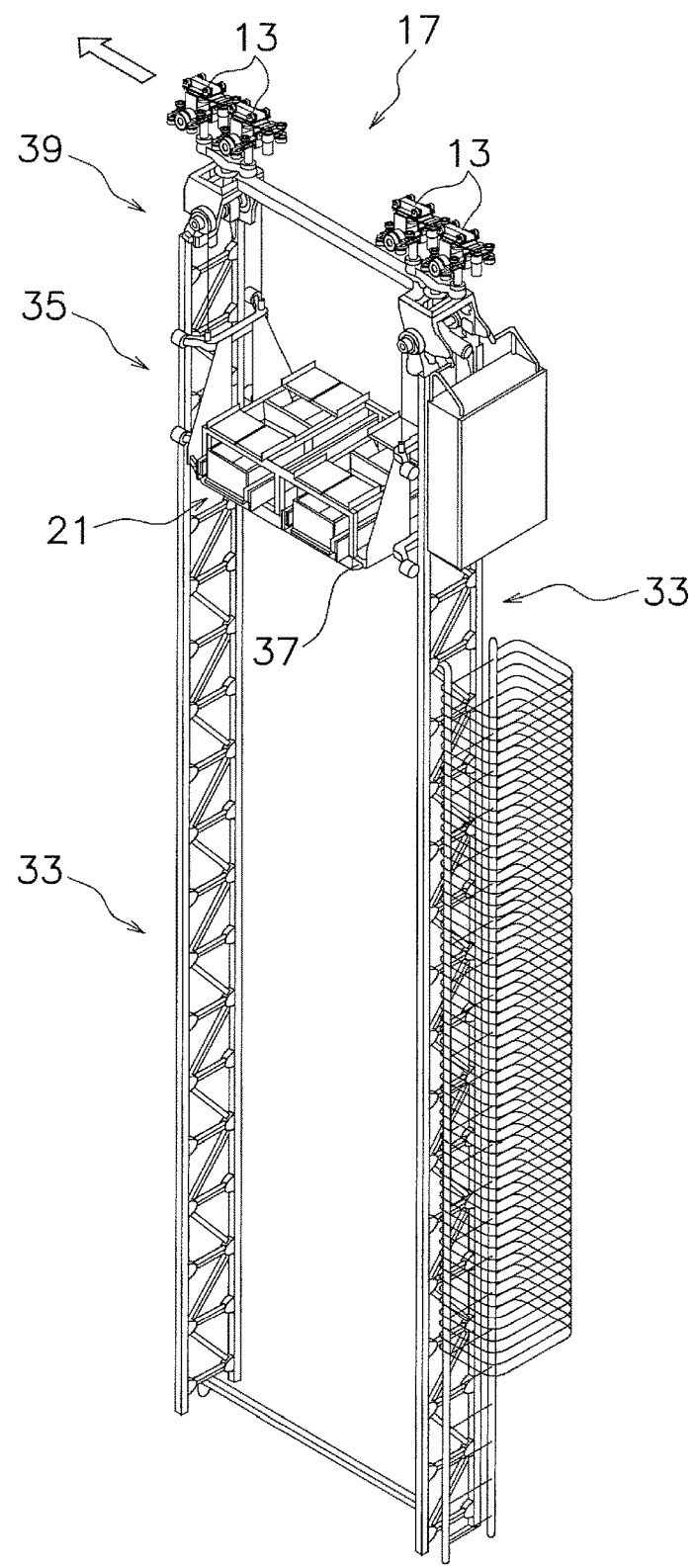
FIG. 7 is a perspective view of the second stacker crane.
Figure 8:
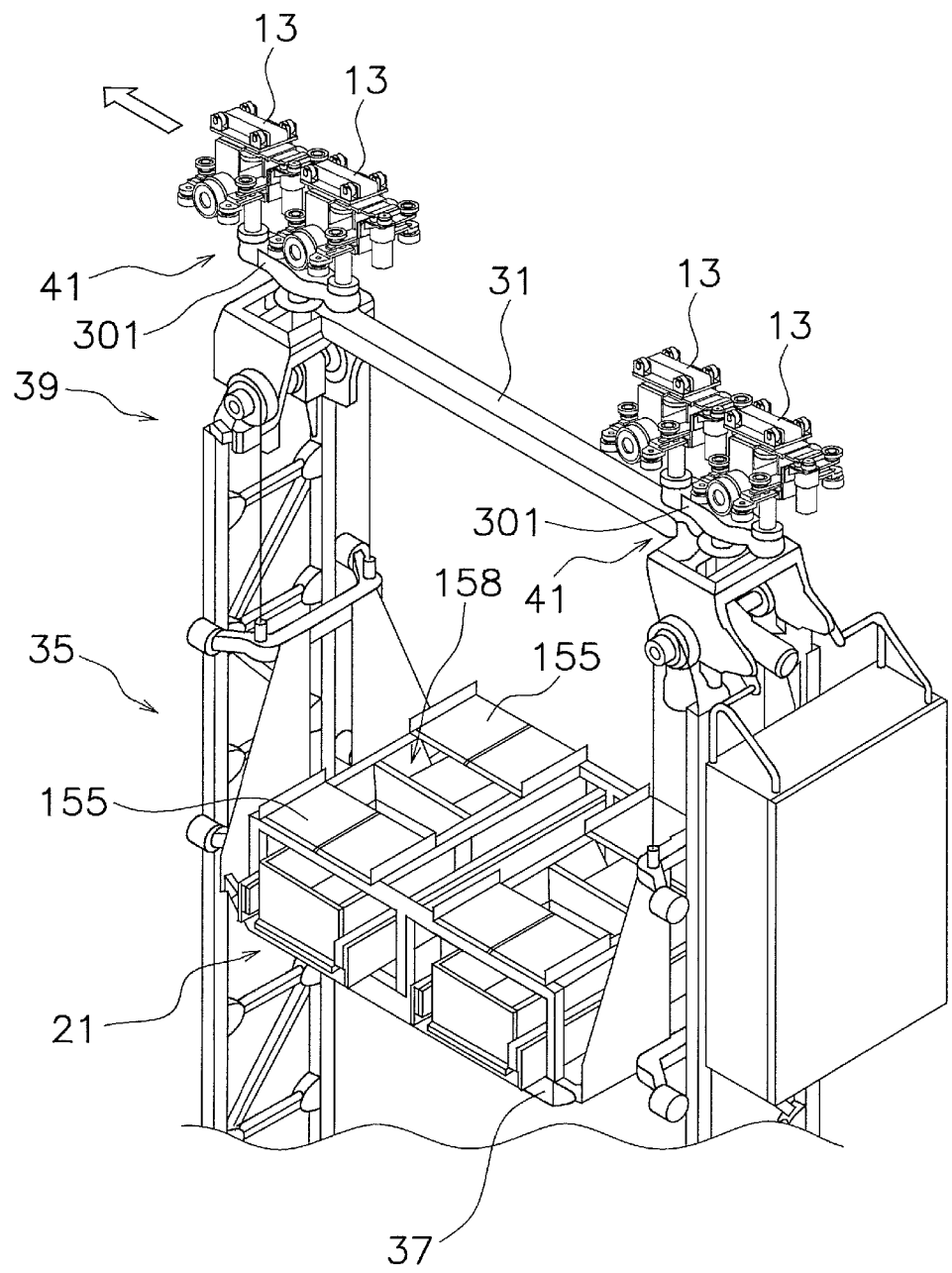
FIG. 8 is a perspective view of an upper part of the second stacker crane.

With reference to FIGS. 7 and 8, the second stacker crane 17 is described. FIG. 7 is a perspective view of the second stacker crane. FIG. 8 is a perspective view of an upper part of the second stacker crane.

As illustrated in FIGS. 7 and 8, the four driving trucks 13 are arranged in the traveling direction. Further, the driving trucks 13 constitute a second bogie structure 41. The second bogie structure 41 includes a first member 301 by which two driving trucks 13 neighboring in the traveling direction are supported in a rotatable manner about a vertical axis.

With the second bogie structure 41, the two driving trucks 13 are supported in a rotatable manner with respect to the first member 301. With this structure, the first stacker crane 11 and the second stacker crane 17 can stably travel curves of the round track. Note that details of the second bogie structure 41 will be described later.

The base structure and the lifting device structure of the second stacker crane 17 are basically the same as those of the first stacker crane 11, but have some difference for supporting different weights. Specifically, the base structure and the lifting device of the second stacker crane 17 have smaller and lighter members than the structures of the first stacker crane.

Note that in this embodiment, two driving trucks 13 are disposed corresponding to the mast 33 on the front side in the traveling direction, and two driving trucks 13 are disposed corresponding to the mast 33 on the rear side in the traveling direction. In particular, the two driving trucks 13 are arranged so that the traveling direction center of the two driving trucks 13 corresponds to the mast 33. With the structure described above, the driving trucks 13 can uniformly support weight applied from the mast 33.

However, the number of the driving trucks 13 and the arrangement of them are not limited to those in the embodiment described above.

(4) Driving Truck

Figure 9:
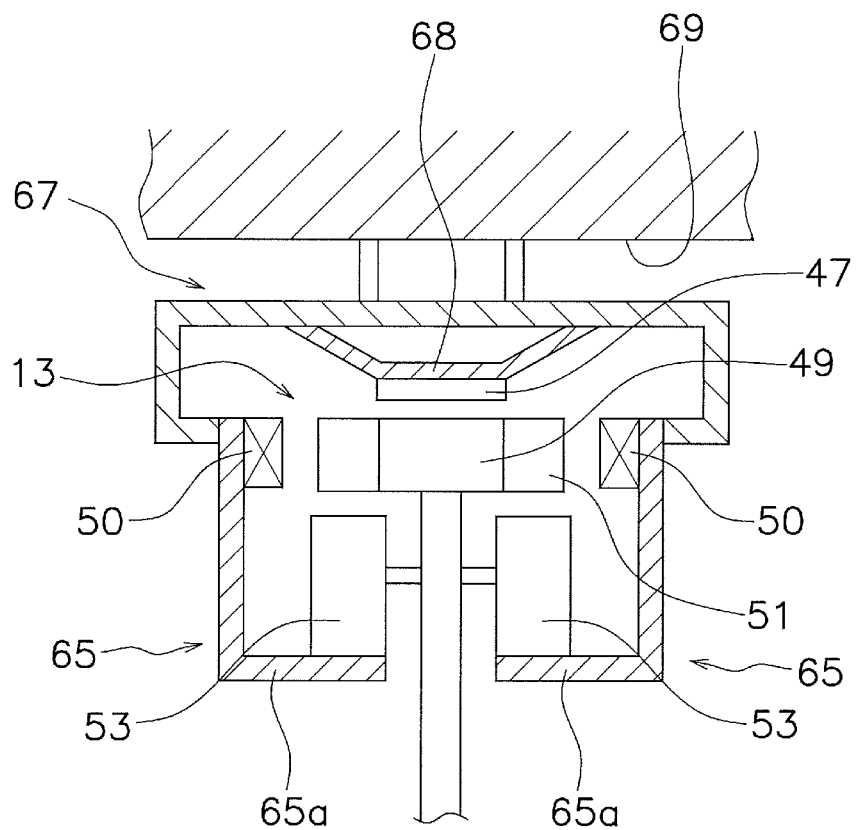
FIG. 9 is a schematic cross-sectional view illustrating a schematic structure of a driving truck.
Figure 10:
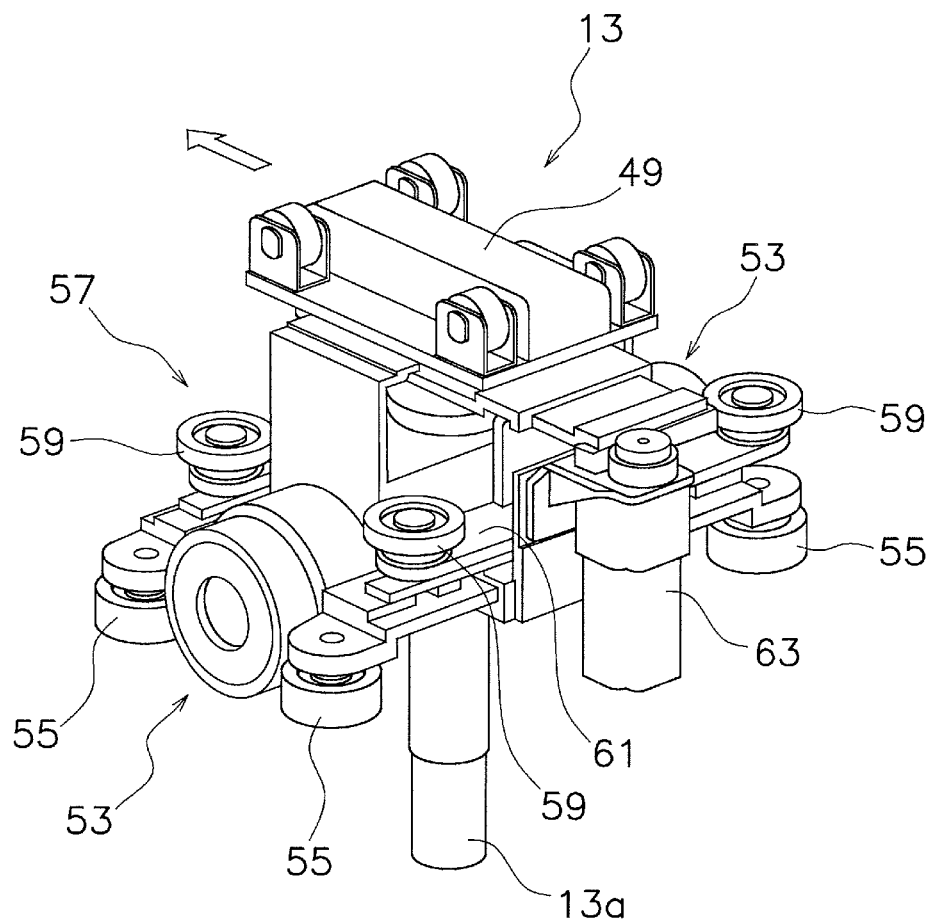
FIG. 10 is a perspective view of the driving truck.
Figure 11:
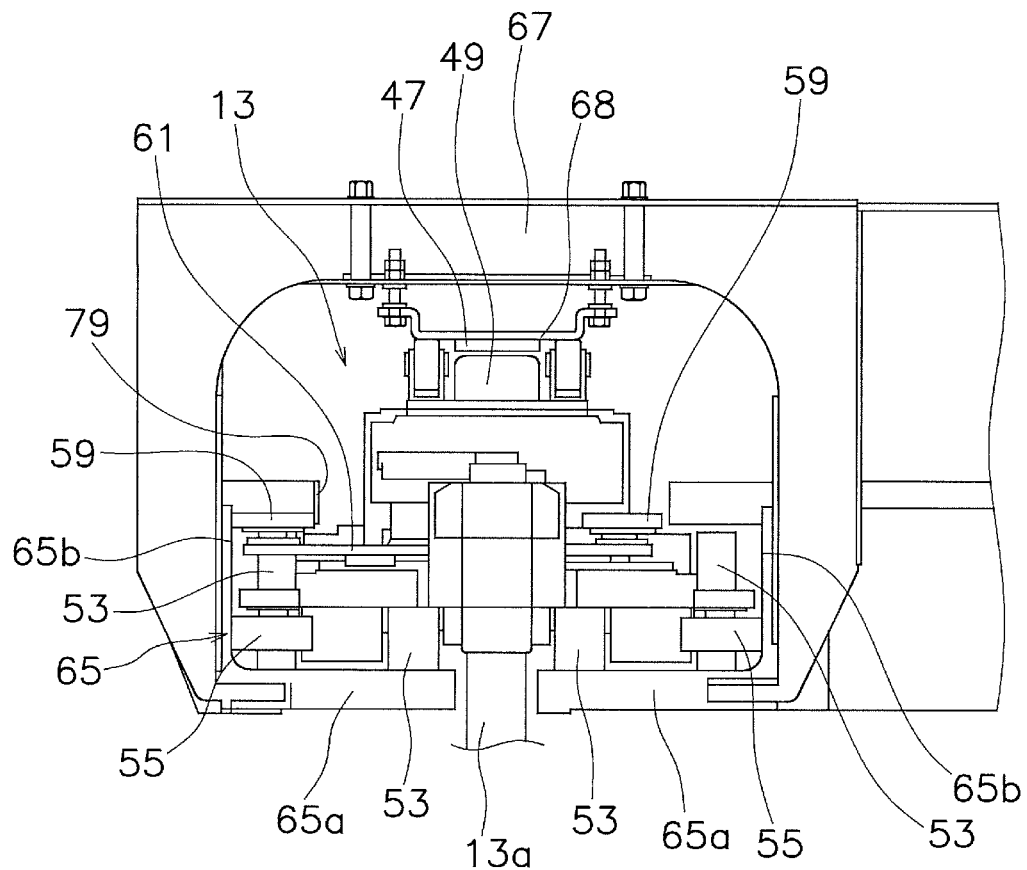
FIG. 11 is a front view of the driving truck.
Figure 12:
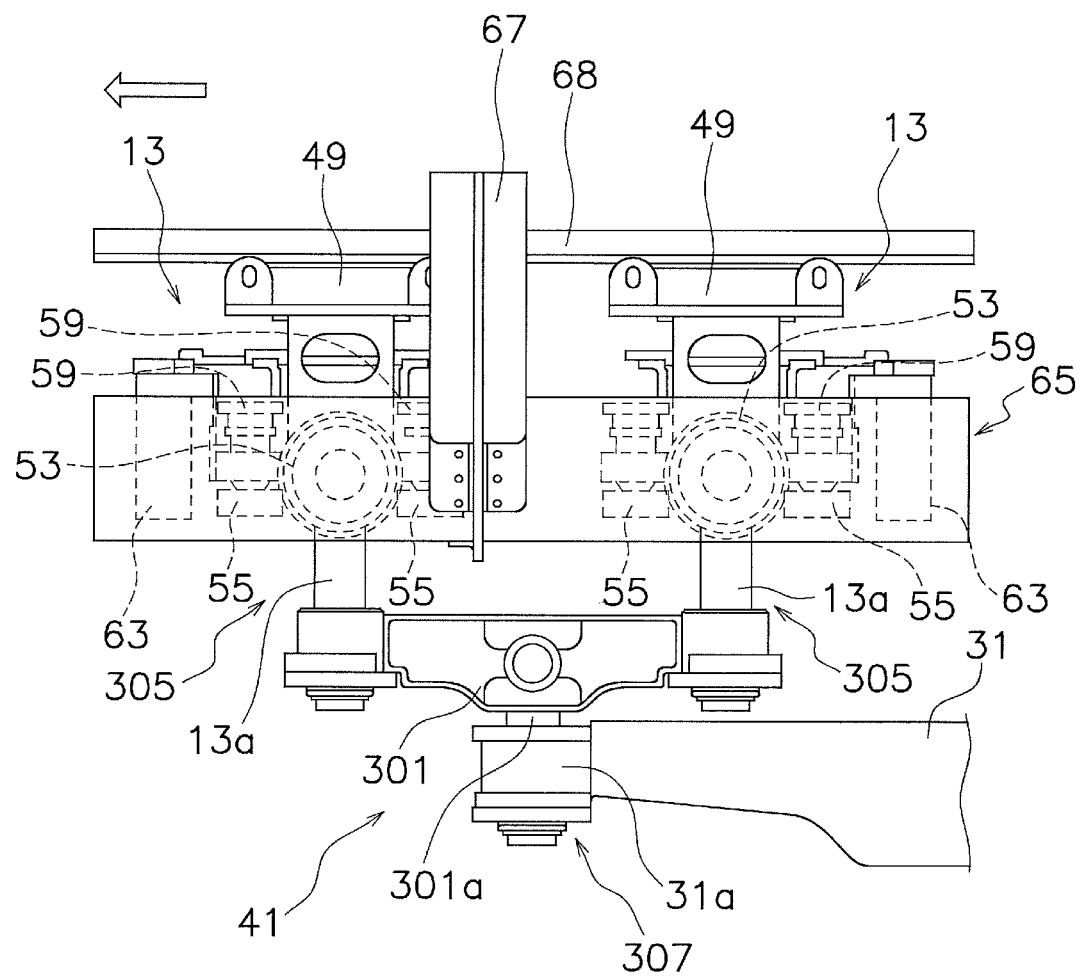
FIG. 12 is a side view of the driving truck and a first bogie structure.

With reference to FIGS. 9 to 12, the driving truck 13 is described. FIG. 9 is a schematic cross-sectional view illustrating a schematic structure of the driving truck. FIG. 10 is a perspective view of the driving truck. FIG. 11 is a front view of the driving truck. FIG. 12 is a side view of the driving truck and the first bogie structure. In the following description, the direction perpendicular to the traveling direction is referred to as a "left and right direction".

FIG. 9 is used for schematic description. The driving truck 13 includes a linear motor 49 constituted of a coil opposed to a permanent magnet 47 mounted on a ceiling 69 side. Specifically, the permanent magnet 47 is fixed to the under surface of a plate 68 fixed to a support member 67 and extending in the traveling direction. In addition, the driving truck 13 includes a power receiving coil 51 disposed at a position corresponding to a noncontact feeder line 50 mounted to the ceiling rail 7. Further, the driving truck 13 includes traveling wheels 53. The traveling wheels 53 are placed on traveling walls 65a (described later) of the ceiling rail 7.

With reference to FIGS. 10 to 12, the driving truck 13 is described in more detail. The driving truck 13 includes guide rollers 55. The guide roller 55 is guided by an inner side surface of a side wall 65b (described later) of the ceiling rail 7. In this embodiment, total four guide rollers 55 are disposed to form two pairs, each arranged in the traveling direction.

The driving truck 13 includes a branch junction switching device 57. The branch junction switching device 57 is a device for selecting a travel path at a branch junction point in the round track. The branch junction switching device 57 includes a switching roller 59. In this embodiment, total four switching rollers 59 are disposed to form two pairs, each arranged in the traveling direction. The switching rollers 59 are disposed above the guide rollers 55. The distance between the switching rollers 59 in the left and right direction is shorter than the distance between the guide rollers 55 in the left and right direction. The switching rollers 59 are connected with a plate 61, and the plate 61 can slide in the left and right direction. The branch junction switching device 57 includes a motor 63 for generating power for driving the plate 61 to slide.

As described above, because each of the driving trucks 13 is provided with the power receiving coil 51 (an example of a power receiving device), the switching roller 59 (an example of a branch switching roller), and the linear motor 49, it is easy to support increase or decrease of the number of driving trucks. In addition, because the driving trucks can be separately controlled, it is possible to perform easy and precise control.

(5) Bogie Structure

With reference to FIG. 13, the first bogie structure 29 is described in detail. FIG. 13 is a schematic side view illustrating a schematic structure of the first bogie structure.

The first bogie structure 29 constitutes a weight supporting part of the first stacker crane 11 and includes multiple levels of bogies. In this embodiment, the first bogie structure 29 includes three levels of bogies. In other words, the two driving trucks 13 have the bogie structure, and further using the bogie structure, the bogie structure of four driving trucks 13 is formed. Further using the bogie structure, the bogie structure of eight driving trucks is formed. Hereinafter, the first bogie structure 29 is described in detail.

The first bogie structure 29 includes the first member 201 (an example of a bogie member) by which a driving truck shaft 13a extending downward from the driving truck 13 is supported in a rotatable manner. The lower end of the driving truck shaft 13a is supported by the first member 201 in a rotatable manner so as to support weight of the first member 201. The first member 201 extends in the traveling direction, and the driving truck shafts 13a are supported in a rotatable manner at both ends thereof in the traveling direction. In other words, the first member 201 supports the pair of driving trucks 13 in a rotatable manner each. In this way, in the first stacker crane 11, a first level of bogie structure 205 is realized for each of the driving trucks 13, and there are total eight bogie structures.

Further, the first bogie structure 29 includes a second member 203 by which a first shaft 201a extending downward from the first member 201 is supported in a rotatable manner. The lower end of the first shaft 201a is supported by the second member 203 in a rotatable manner so as to support weight of the second member 203. The second member 203 extends in the traveling direction, and the first shafts 201a are supported in a rotatable manner at both ends thereof in the traveling direction. In other words, the second member 203 supports the pair of first members 201 in a rotatable manner.

In this way, in the first stacker crane 11, a second level of bogie structure 207 is realized for each of the first members 201, and there are total four bogie structures.

Further, the first bogie structure 29 includes a supporting part 31a by which a second shaft 203a extending downward from the second member 203 is supported in a rotatable manner at both ends of the upper side base member 31 in the traveling direction. The lower end of the second shaft 203a is supported by the supporting part 31a in a rotatable manner, so as to support weight of the supporting part 31a. In other words, the supporting part 31a supports the pair of second members 203 in a rotatable manner. In this way, in the first stacker crane 11, a third level of bogie structure 209 is realized for each of the second members 203, and there are total two bogie structures.

Figure 14:
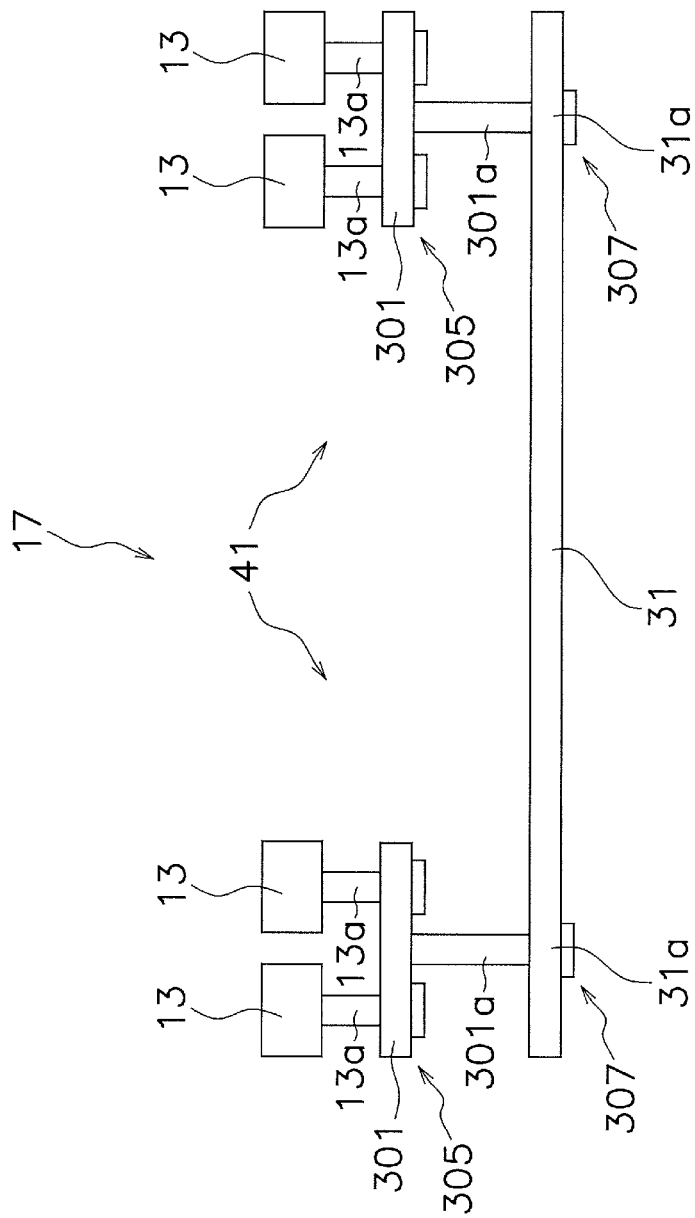
FIG. 14 is a schematic side view illustrating a schematic structure of a second bogie structure.

With reference to FIG. 14, the second bogie structure 41 is described in detail. FIG. 14 is a schematic side view illustrating a schematic structure of the second bogie structure.

The second bogie structure 41 constitutes a weight supporting part of the second stacker crane 17 and includes multiple levels of bogies. In this embodiment, the second bogie structure 41 includes two levels of bogies. In other words, the two driving trucks 13 have the bogie structure, and further using the bogie structure, the bogie structure of four driving trucks 13 is formed. Hereinafter, the second bogie structure 41 is described in detail.

The second bogie structure 41 includes the first member 301 (an example of the bogie member) by which the driving truck shaft 13a extending downward from the driving truck 13 is supported in a rotatable manner. The lower end of the driving truck shaft 13a is supported by the first member 301 in a rotatable manner so as to support weight of the first member 301. The first member 301 extends in the traveling direction, and the driving truck shafts 13a are supported in a rotatable manner at both ends thereof in the traveling direction. In other words, the first member 301 supports the pair of driving trucks 13 in a rotatable manner each.

In this way, in the second stacker crane 17, a first level of bogie structure 305 (an example of the bogie structure) is realized for each of the driving trucks 13, and there are total four bogie structures. In other words, the second stacker crane 17 includes a smaller number of bogie structures than the first stacker crane 11.

Further, the second bogie structure 41 includes the supporting part 31a by which a first shaft 301a extending downward from the first member 301 is supported in a rotatable manner at both ends of the upper side base member 31 in the traveling direction. The lower end of the first shaft 301a is supported by the supporting part 31a in a rotatable manner, so as to support weight of the supporting part 31a. In other words, the supporting part 31a supports the pair of first member 301 in a rotatable manner. In this way, in the second stacker crane 17, the second level of bogie structure 307 is realized for each of the first members 301, and there are total two bogie structures.

In other words, in this embodiment, the bogie structure is realized for the two driving trucks each, and further the next level of bogie structure is realized for the two bogie structures each. Thus, the number of the driving trucks in the stacker crane is a power of two.

(6) Ceiling Rail

Figure 15:
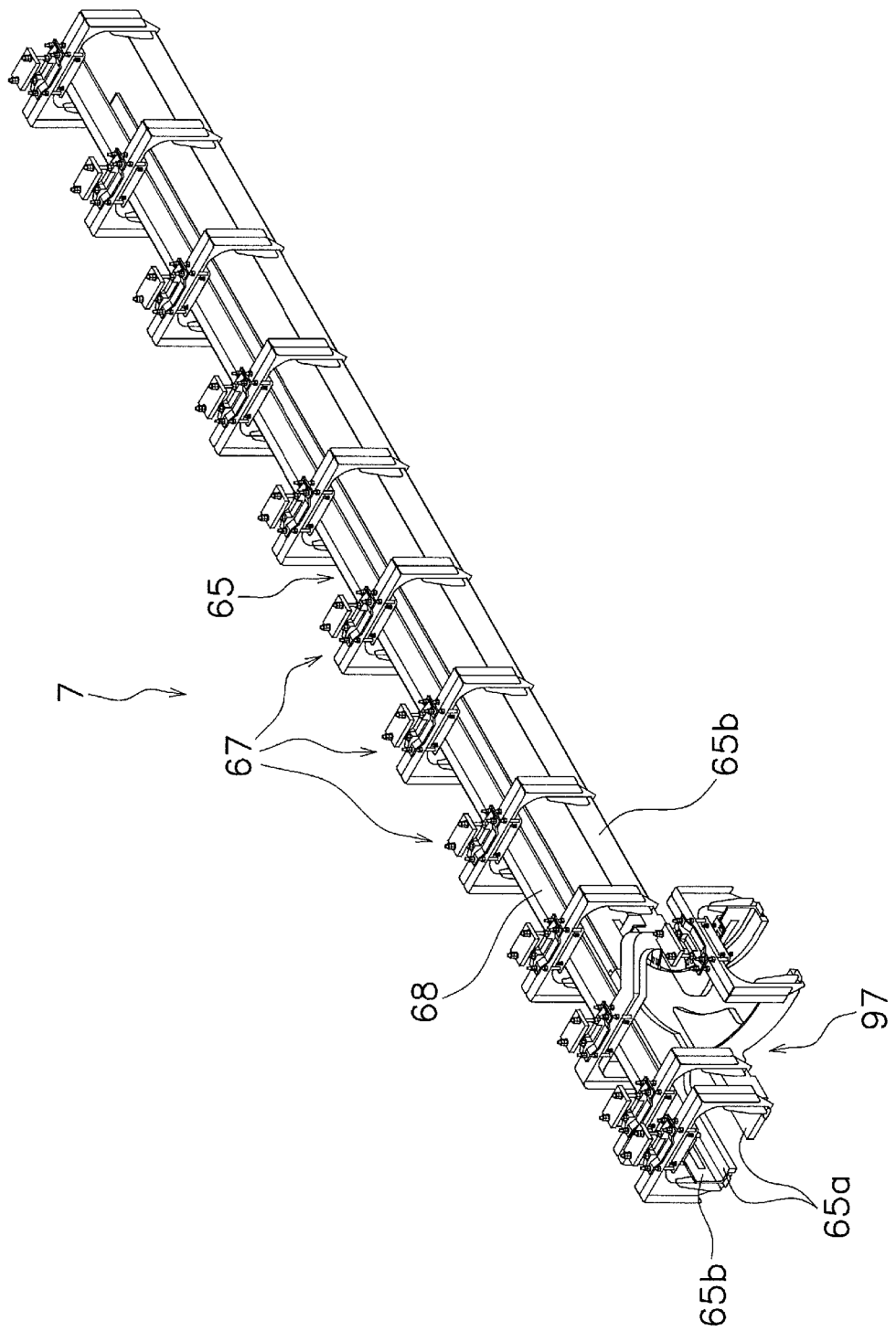
FIG. 15 is a perspective view of a linear structure of a ceiling rail.

With reference to FIG. 15, the ceiling rail 7 is described. FIG. 15 is a perspective view of a linear structure of the ceiling rail.

As understood from FIG. 15, the ceiling rail 7 includes a rail main body 65. The rail main body 65 includes mainly the traveling walls 65a and the side walls 65b. The traveling walls 65a constitute a pair of traveling surfaces arranged in the left and right direction with a space therebetween. The side walls 65b constitute a pair of guide surfaces disposed on both sides of the traveling surfaces. The ceiling rail 7 includes a plurality of the support members 67. The support member 67 suspends the rail main body 65 from the ceiling 69.

(7) Branch Switching Structure

Figure 16:
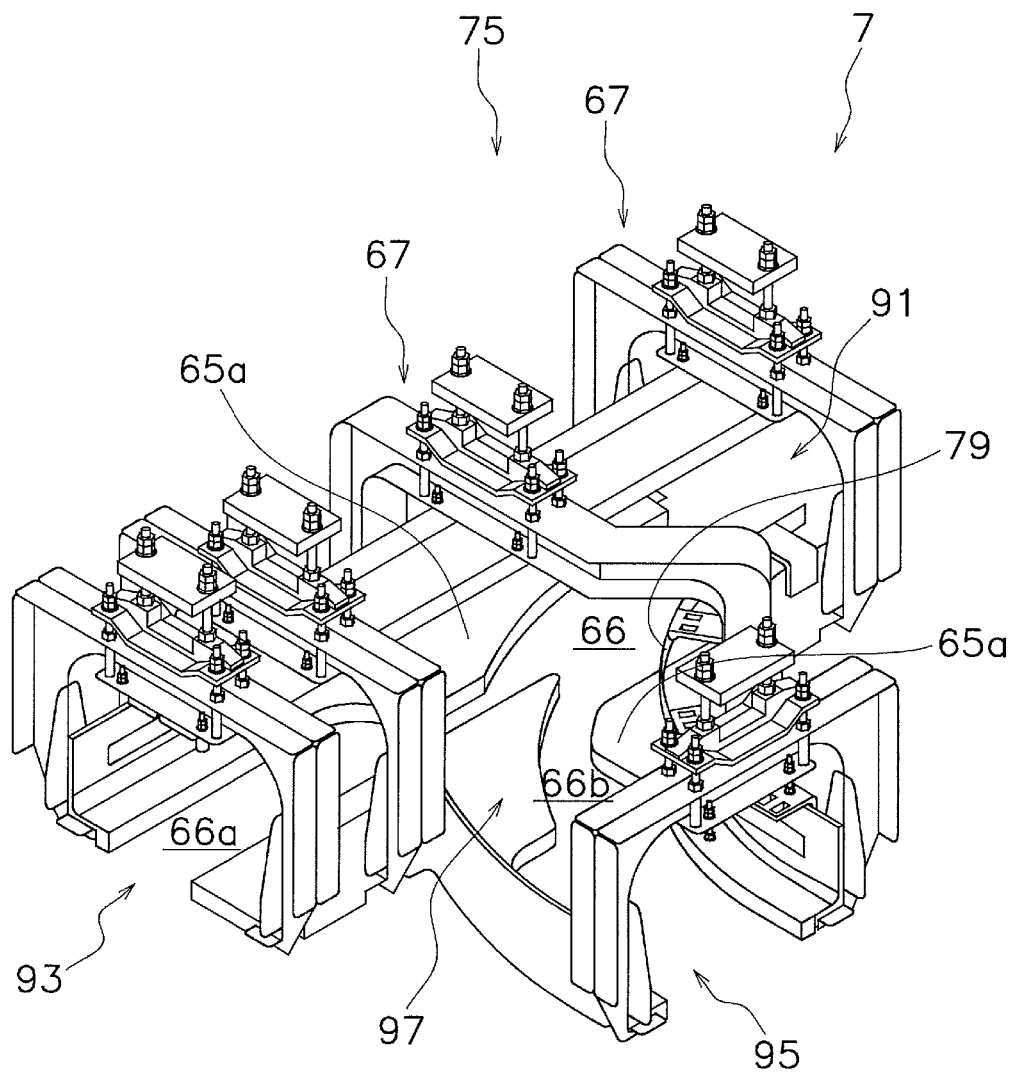
FIG. 16 is a perspective view of a branch part of the ceiling rail.
Figure 17:
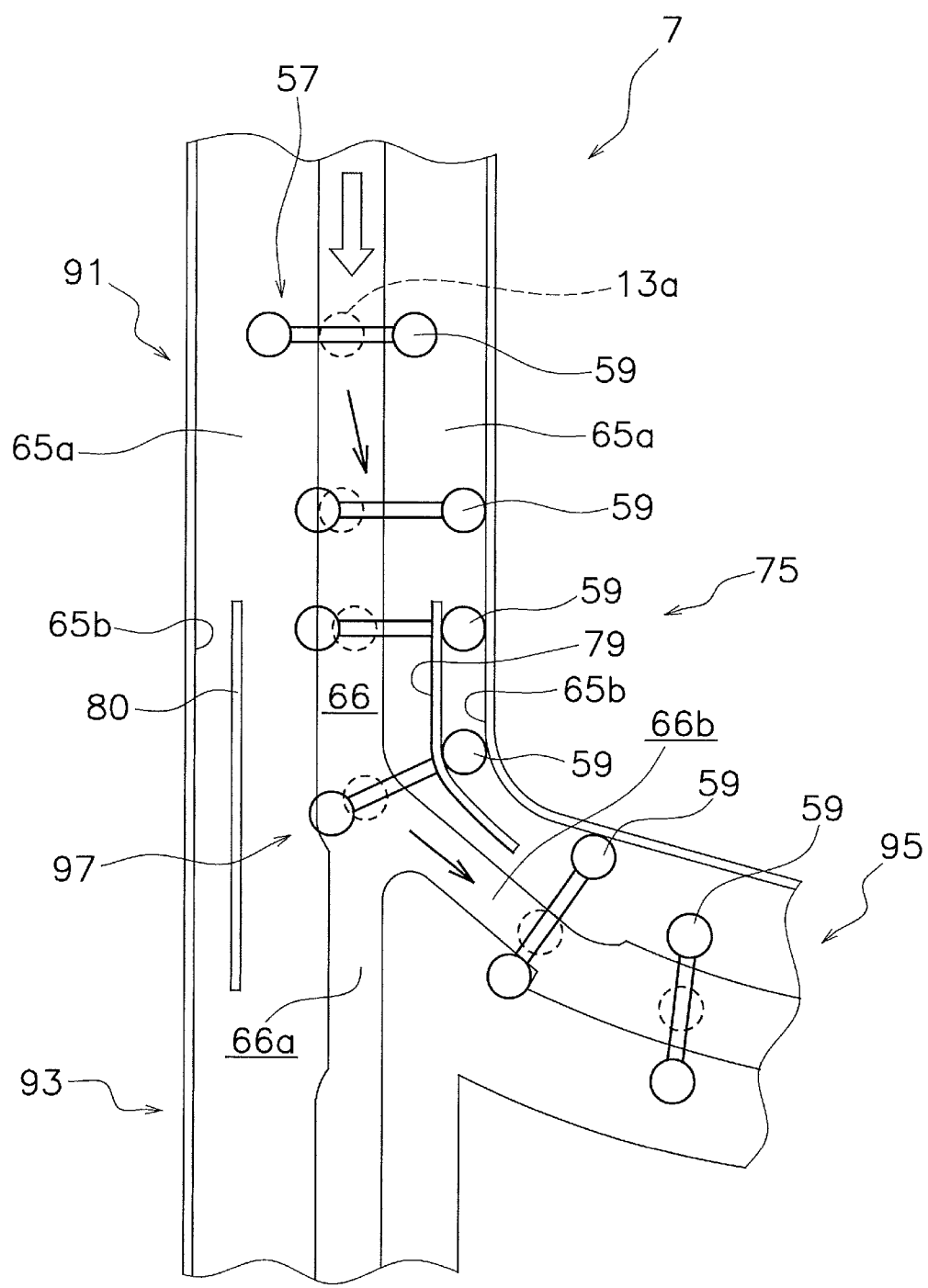
FIG. 17 is a schematic plan view schematically illustrating a branch operation of the driving truck.

With reference to FIGS. 16 and 17, a branch switching structure 75 is described. FIG. 16 is a perspective view of the branch part of the ceiling rail. FIG. 17 is a schematic plan view schematically illustrating a branch operation of the driving truck. Note that, for simplification in the following description, only an operation of one switching roller 59 of one driving truck 13 is described.

As illustrated in FIG. 16, the ceiling rail 7 includes a first linear path 91 on the upper right side in the diagram, a second linear path 93 on the lower left side in the diagram, a curved path 95 on the lower right side in the diagram, and a branch part 97.

In FIG. 16, for example, the driving truck 13 moves along the first linear path 91 from the upper right side in the diagram to the left side in the diagram, and selects whether to move linearly or branch at the branch part 97. As illustrated in FIG. 16, at the branch part 97, a gap 66 between left and right traveling walls 65a branches into a linear side gap 66a and a curve side gap 66b. Further, a branching guide rail 79 is disposed above the traveling wall 65a at a curved part. The branching guide rail 79 is disposed in a curved shape so that a predetermined gap is secured between itself and the side wall 65b of the curved part on the branch side. In addition, as illustrated in FIG. 17, a linear guide rail 80 is disposed above the traveling wall 65a at a linear part. The linear guide rail 80 is disposed in a linear shape so that a predetermined gap is secured between itself and the side wall 65b of the linear part.

With reference to FIG. 17, the branch operation is described. When the driving truck 13 reaches near the branch part 97, the switching roller 59 is moved to the right side in the diagram. Then, the switching roller 59 enters between the branching guide rail 79 and the side wall 65b. Therefore, the driving truck 13 is held by the branching guide rail 79 so as to move to the curved path 95 side. As a result, the driving truck shaft 13a enters the linear side gap 66a on the curved path 95 side. By the operation described above, the branch operation of the driving truck 13 is completed.

Note that although not illustrated, in a case where the driving truck 13 travels linearly at the branch part 97, when the driving truck 13 reaches near the branch part 97, the switching roller 59 is moved to the left side in FIG. 17. Then, the switching roller 59 enters between the linear guide rail 80 and the side wall 65b. Therefore, the driving truck 13 is held by the linear guide rail 80 so as to move to the second linear path 93 side. As a result, the driving truck shaft 13a enters the curve side gap 66b on the second linear path 93 side. By the operation described above, the linear direction moving operation of the driving truck 13 is completed.

(8) Control Structure of Picking System

Figure 18:
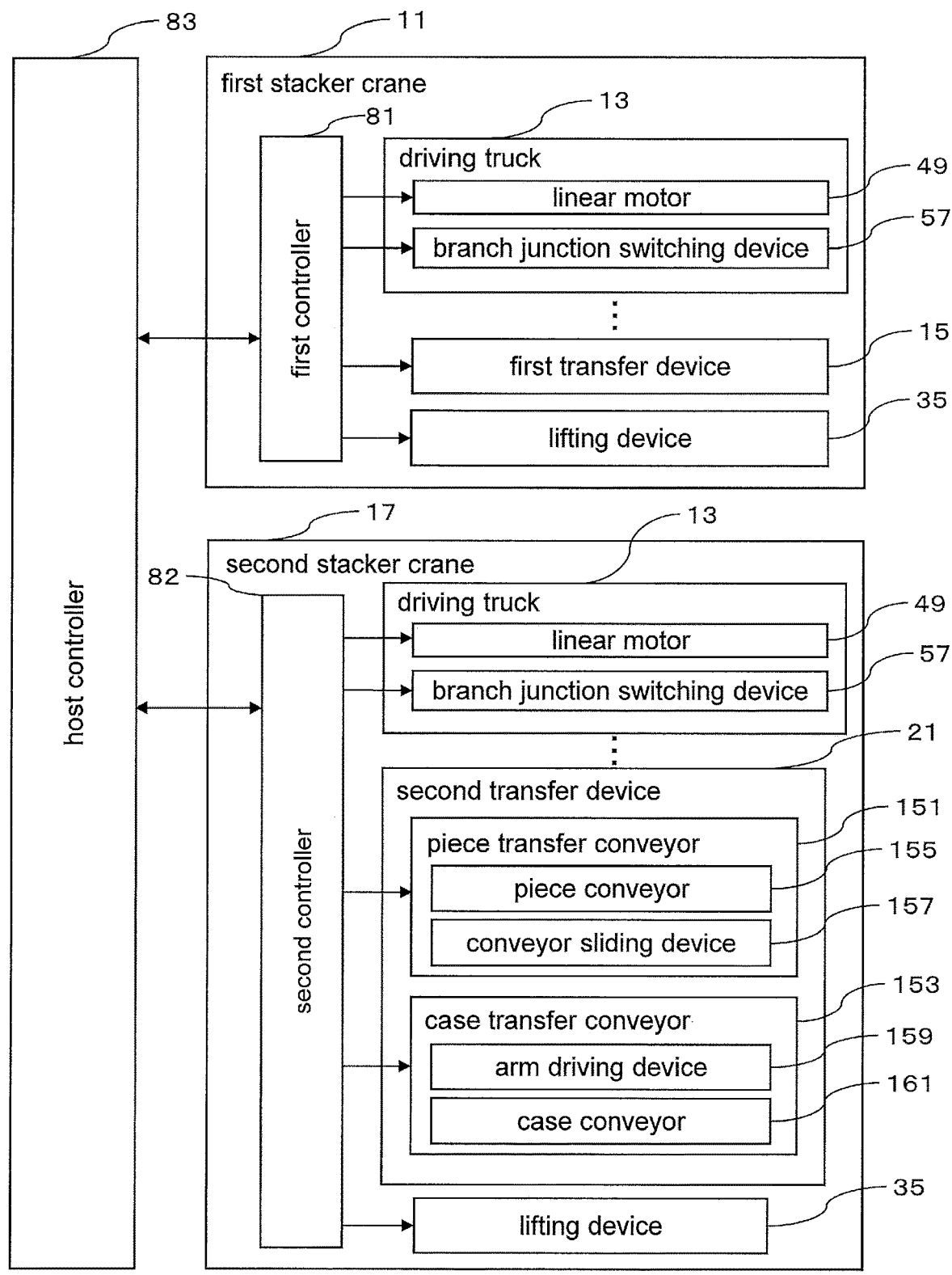
FIG. 18 is a block diagram illustrating a control structure of the automated warehouse.

With reference to FIG. 18, a control structure of the picking system is described. FIG. 18 is a block diagram illustrating a control structure of the automated warehouse.

The first stacker crane 11 includes a first controller 81. The first controller 81 is a computer including a CPU, a RAM, a ROM, and the like, to execute programs.

The first controller 81 controls operations of the driving trucks 13 of the first stacker crane 11. The first controller 81 is connected to the linear motors 49 and the branch junction switching devices 57 of the driving trucks 13. Further, the first controller 81 is connected to the first transfer device 15 and the lifting device 35, and hence the first controller 81 can transmit drive signals to the devices. The first transfer device 15 is, for example, a conventional slide fork type, which includes a slide fork 15a (FIG. 5).

Note that a sensor for detecting information about a travel state is disposed in each driving truck 13. Thus, the first controller 81 can control appropriate timings and abilities of travel driving, branch switching, and the like, based on respective positions of each driving truck 13.

The second stacker crane 17 includes a second controller 82. The second controller 82 is a computer including a CPU, a RAM, a ROM, and the like, to perform programs.

The second controller 82 controls operations of the driving trucks 13 of the second stacker crane 17. The second controller 82 is connected to the linear motors 49 and the branch junction switching devices 57 of the driving trucks 13. Further, the second controller 82 is connected to the second transfer device 21 and the lifting device 35, and hence the second controller 82 can transmit drive signals to the motors thereof.

The second transfer device 21 includes a piece transfer conveyor 151 and a case transfer conveyor 153. The piece transfer conveyor 151 includes piece conveyors 155 and a conveyor sliding device 157. The piece conveyors 155 are conveyors that can transport goods. The conveyor sliding device 157 is a device that can move the piece conveyor 155 itself to slide. The case transfer conveyor 153 includes an arm driving device 159 and a case conveyor 161. The arm driving device 159 is a device that transfers the container 23 by expanding and contracting the arm in the left and right direction. The case conveyor 161 can transport the container 23 in the left and right direction, and is a belt conveyor, for example.

Note that a sensor for detecting information about a travel state is disposed in each driving truck 13. Thus, the second controller 82 can control appropriate timings and abilities of travel driving, branch switching, and the like, based on respective positions of each driving truck 13.

The first controller 81 and the second controller 82 can communicate with a host controller 83. The host controller 83 is a computer including a CPU, a RAM, a ROM, and the like, to perform programs. The host controller 83 controls the entire automated warehouse 3, and in particular controls transfer and transport of the container 23 and the goods collection shelf member 25 by the first stacker crane 11 and the second stacker crane 17, as well as assortment of load of the retrieved goods. The host controller 83 has an assigning function in which the first stacker crane 11 and the second stacker crane 17 are managed and assigned with a travel instruction or a transport instruction. Note that the "transport instruction" includes a transfer instruction including the travel instruction and positions for loading and unloading.

(9) Assort Preparation Station

As illustrated in FIG. 1, the picking system 1 includes an assort preparation station 101. The assort preparation station 101 is disposed on the floor, close to a part of the ceiling rail 7 (an example of the round track) in a plan view. The assort preparation station 101 includes a container transfer unit 103 that can give and receive goods to and from the second stacker crane 17. The container transfer unit 103 includes a conveyor 137. The container transfer unit 103 can receive the inventory container 23 containing ordered goods from the second stacker crane 17. Further, the container transfer unit 103 can give the container 23 from which the ordered goods are picked out to the second stacker crane 17. Specifically, the transferring of the container 23 described above is performed by the case transfer conveyor 153 of the second transfer device 21 of the second stacker crane 17.

(10) Digital Assort System Area

As illustrated in FIG. 1, the picking system includes a digital assort system area 107. This area 107 is disposed on the floor, close to a part of the round track of the ceiling rail 7 in a plan view. As illustrated in FIG. 1, the area 107 includes an installation place 107a in which the pallets P and the goods collection shelf members 25 can be placed. As illustrated in FIG. 1, the area 107 includes a goods collection shelf member receiving unit 109 that receives the goods collection shelf member 25 from the first stacker crane 11, and a goods collection shelf member transfer unit 111 that transfers the goods collection shelf member 25 to the first stacker crane 11. Specifically, the transferring of the goods collection shelf member 25 described above is performed by the slide fork 15a of the first transfer device 15 of the first stacker crane 11.

As illustrated in FIG. 1, the picking system 1 includes automated guided vehicles 115. The automated guided vehicle 115 is disposed in the digital assort system area 107 and moves the goods collection shelf member 25 placed on a cart with casters by pushing or pulling the same.

In addition, the picking system 1 includes an assort cart 113 as illustrated in FIG. 1. The assort cart 113 is disposed in the digital assort system area 107, and for example, a worker uses the assort cart 113 carrying one type of goods so as to distribute the goods to the container 23 housed in the goods collection shelf member 25.

(11) Depalletizer Picking Station

As illustrated in FIG. 1, the picking system 1 includes a depalletizer picking station 121. The depalletizer picking station 121 is disposed on the floor, close to a part of the ceiling rail 7 in a plan view. The depalletizer picking station 121 is used for unloading the article placed on the pallet P (for example, the goods storing box 28) from the pallet P. The unloaded article is still in a state of the goods storing box 28, or the goods are picked out of the goods storing box 28 and are put into the container 23. The depalletizer picking station 121 includes an article transfer unit 123 that can receive the container 23 from the goods collection shelf member 25 transferred from the first stacker crane 11. The article transfer unit 123 includes a conveyor 171 and a robot (not shown). Specifically, the transferring of the goods collection shelf member 25 or the pallet P described above is performed by the slide fork 15a of the first transfer device 15 of the first stacker crane 11.

(12) Chute

The picking system 1 further includes a chute 127 disposed on the floor, close to a part of the ceiling rail 7 in a plan view, so as to discharge the container 23 and/or the goods to other facilities.

2. Features of Embodiment

The automated warehouse 3 includes the rack 5 (an example of the rack), the ceiling rail 7 (an example of the track), the first stacker crane 11 (an example of the first suspension type stacker crane), and the second stacker crane 17 (an example of the second suspension type stacker crane).

The rack 5 includes the multiple levels of shelves 5a (an example of the shelves).

The ceiling rail 7 is disposed along the rack 5 at a position higher than the multiple levels of shelves 5a.

The first stacker crane 11 includes the plurality of driving trucks 13 (an example of the driving trucks) arranged in the traveling direction so as to travel along the ceiling rail 7, the mast 33 (an example of the mast) extending in the vertical direction, and the first transfer device 15 suspended in a liftable manner with respect to the plurality of driving trucks 13 and capable of moving up and down along the mast 33.

The second stacker crane 17 includes the plurality of driving trucks 13 (an example of the driving trucks) whose number is smaller than the number of the driving trucks 13 described above, arranged in the traveling direction so as to travel along the ceiling rail 7, the mast 33 extending in the vertical direction, and the second transfer device 21 suspended in a liftable manner with respect to the plurality of driving trucks 13, and capable of moving up and down along the mast 33, so as to transfer an article lighter than the article transferred by the first transfer device 15.

The first stacker crane 11 and the second stacker crane 17 have different numbers of driving trucks, so as to support articles with different weights. In other words, by adopting the structure in which the same type and different numbers of driving trucks are used, two types of stacker cranes that can carry articles with different weights can travel the same track. As a result, the automated warehouse 3 of low cost can be realized.

3. Other Embodiments

Although the embodiments of the present invention are described above, the present invention is not limited to the embodiments described above but can be variously modified within the scope of the invention without deviating from the spirit thereof. In particular, the plurality of embodiments and variations described in this specification can be arbitrarily combined as necessary.

(1) In another embodiment, it is possible to use only one type of the stacker cranes having the same number of driving trucks.

(2) Although the two types of stacker cranes having different numbers of the driving trucks are used in the embodiment described above, it is possible to use three or more types of the stacker cranes having different numbers of the driving trucks.

(3) Although the drive source for the driving truck is a linear motor in the embodiment described above, the drive source may be a combination of other type of motor and a drive mechanism.

(4) Although all of the driving trucks are combined with the bogie structure in the embodiment described above, it is possible to adopt a structure constituted of only the driving trucks without using the bogie structure, or a structure in which the driving trucks combined with the bogie structure and the driving trucks without combining with the bogie structure are mixed.

(5) Specific structures of the first transfer device and the second transfer device are not limited to those of the embodiment described above. It is possible to use a known transfer device.

(6) A structure of the branch switching roller is not limited to that of the embodiment described above. It is possible to use a known branch switching device.

(7) A structure of the power receiving device is not limited to that of the embodiment described above. It is possible to use a known power receiving device.

INDUSTRIAL APPLICABILITY

The present invention can widely be applied to automated warehouses including a suspension type stacker crane having a transfer device suspended in a liftable manner from driving trucks.

REFERENCE SIGNS LIST 1 picking system
3 automated warehouse
5 rack
5a shelf
5b lane
7 ceiling rail
11 first stacker crane
13 driving truck
13a driving truck shaft
15 first transfer device
15a slide fork
17 second stacker crane
18 lower part guide rail
21 second transfer device
23 container
25 goods collection shelf member
28 goods storing box
29 first bogie structure
31 upper side base member
33 mast
35 lifting device
37 lift table
39 lifting unit
41 second bogie structure
47 permanent magnet
49 linear motor
50 noncontact feeder line
51 power receiving coil
53 traveling wheel
55 guide roller
57 branch junction switching device
59 switching roller
61 plate
63 motor
65 rail main body
65a traveling wall
65b side wall
66 gap
66a linear side gap
66b curve side gap
67 support member
68 plate
69 ceiling
75 branch switching structure
79 branching guide rail
80 linear guide rail
81 first controller
82 second controller
83 host controller
91 first linear path
93 second linear path
95 curved path
97 branch part
101 assort preparation station
103 container transfer unit
107 area
107a installation place
109 goods collection shelf member receiving unit
111 goods collection shelf member transfer unit
113 assort cart
115 automated guided vehicle
121 picking station
123 container transfer unit
127 chute
151 piece transfer conveyor
153 case transfer conveyor
155 piece conveyor
157 conveyor sliding device
159 arm driving device
161 case conveyor
171 conveyor
201 first member
201a first shaft
203 second member
203a second shaft
205 first level of bogie structure
207 second level of bogie structure
209 third level of bogie structure
301 first member
301a first shaft
305 first level of bogie structure
307 second level of bogie structure
P pallet

The invention claimed is:

1. An automated warehouse comprising:
a rack including multiple levels of shelves;
a track disposed along the rack at a position higher than the multiple levels of shelves;
a first suspension type stacker crane including a plurality of driving trucks arranged in a traveling direction so as to travel along the track, a mast extending in the vertical direction, and a first transfer device suspended in a liftable manner with respect to the plurality of driving trucks and capable of moving up and down along the mast; and
a second suspension type stacker crane including a plurality of driving trucks whose number is smaller than the number of the driving trucks of the first suspension type stacker crane, arranged in the traveling direction so as to travel along the track, a mast extending in the vertical direction, and a second transfer device suspended in a liftable manner with respect to the plurality of driving trucks, and capable of moving up and down along the mast, so as to transfer an article lighter than the article transferred by the first transfer device.

2. The automated warehouse according to claim 1, wherein
the track has a round track,
each of the first suspension type stacker crane and the second suspension type stacker crane further has a bogie structure including a bogie member supporting two driving trucks neighboring in the traveling direction, in a rotatable manner about a vertical axis, and
the number of the bogie structures of the second suspension type stacker crane is smaller than the number of the bogie structures of the first suspension type stacker crane.

3. The automated warehouse according to claim 2, wherein each of the driving trucks includes a power receiving device and a branch switching roller.

4. The automated warehouse according to claim 1, wherein each of the driving trucks includes a power receiving device and a branch switching roller.

5. A suspension type stacker crane used in an automated warehouse comprising a rack including multiple levels of shelves, and a track having a round track disposed along the rack at a position higher than the multiple levels of shelves, the stacker crane comprising:
 a plurality of driving trucks arranged in a traveling direction to travel along the round track;
 a mast extending in the vertical direction; and
 a transfer device suspended in a liftable manner with respect to the plurality of driving trucks and capable of moving up and down along the mast; and
 a bogie structure having bogies of a plurality of stages connecting the plurality of the driving trucks, the mast being suspended from the bogie structure,
 wherein the bogie structure comprises:
  a first stage bogie structure having a first bogie member by which two driving trucks neighboring in the traveling direction are supported to be rotable about a vertical axis;
  a second stage bogie structure having a second bogie member by which a pair of the first bogie members are supported to be rotable about a vertical axis; and
  a third stage bogie structure having a third bogie member by which a pair of the second bogie members are supported to be rotable about a vertical axis, the mast being suspended from the third stage bogie.

6. The suspension type stacker crane according to claim 5, wherein each of the driving trucks includes a power receiving device and a branch switching roller.

7. A suspension type stacker crane used in an automated warehouse comprising a rack including multiple levels of shelves, and track having a round track disposed along the rack at a position higher than the multiple levels of shelves, the stacker crane comprising:
 a plurality of driving trucks arranged in a traveling direction to travel along the round track;
 a mast extending in the vertical direction; and
 a transfer device suspended in a liftable manner with respect to the plurality of driving trucks and capable of moving up and down along the mast; and
 a bogie structure having bogies of a plurality of stages connecting the plurality of the driving trucks, the mast being suspended from the bogie structure,
 wherein the bogie structure comprises:
  a first stage bogie structure having a first bogie member by which two driving trucks neighboring in the traveling direction are supported to be rotable about a vertical axis; and
  a second stage bogie structure having a second bogie member by which a pair of the first bogie members are supported to be rotable about a vertical axis, the mast being suspended from the second stage bogie.

* * * * *